United States Patent Office  3,206,459
Patented Sept. 14, 1965

3,206,459
10α-PREGNAN-19-OL DERIVATIVES
Alexander D. Cross, Mexico City, Mexico, assignor to Syntex Corporation, Panama, Panama, a corporation of Panama
No Drawing. Filed Oct. 19, 1962, Ser. No. 231,831
19 Claims. (Cl. 260—239.55)

The present invention relates to novel cyclopentanophenanthrene derivatives and to a process for the production thereof.

More particularly the present invention relates to novel 10α-pregnan-19-ol derivatives.

The novel compounds of the present invention are represented by the following formulae:

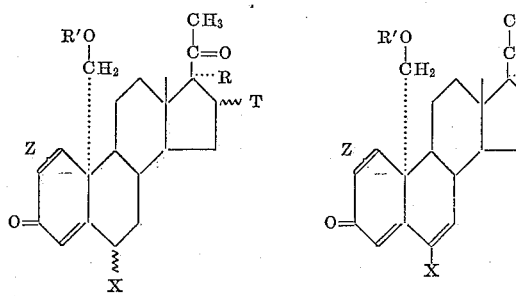

In the above formulae X represents hydrogen, fluorine, chlorine or methyl all having α or β configurations; R represents hydrogen, a hydroxyl group or a hydrocarbon carboxylic acyloxy group of less than 12 carbon atoms; T represents hydrogen, α-hydroxy, α-acyloxy, α-methyl or β-methyl; T and R together represent the group

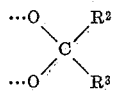

being in the 16α, 17α-positions, wherein $R^2$ and $R^3$ each represents hydrogen or a hydrocarbon residue of up to 8 carbon atoms of straight, branched, cyclic or mixed aliphatic cyclic chain, or aromatic, such as methyl, ethyl, isopropyl, phenyl, methyl-cyclohexyl and the like; $R^1$ represents hydrogen or a hydrocarbon carboxylic acyl group of less than 12 carbon atoms; and Z represents a double bond or a saturated linkage between C-1 and C-2.

The acyl and acyloxy groups are derived from hydrocarbon carboxylic acids containing less than 12 carbon atoms which may be saturated or unsaturated, of straight, branched, cyclic or cyclic-aliphatic chain, aromatic and may be substituted by functional groups such as hydroxy, alkoxy containing up to 5 carbon atoms, acyloxy containing up to 12 carbon atoms, nitro, amino or halogen. Typical ester groups are the acetate, propionate, enanthate, benzoate, trimethylacetate, t-butylacetate, phenoxyacetate, cyclopentylpropionate, aminoacetate, and β-chloropropionate.

The compounds represented by the above formulas are powerful progestational agents with good oral activity. In addition they have anti-androgenic, anti-gonadotrophic and anti-estrogenic properties and are very useful in fertility control. Furthermore they may be used in the treatment of premenstrual tension and exhibit blood cholesterol lowering and diuretic activities. When applied topically, these compounds are very useful in the treatment of acne.

The novel compounds of the present invention are prepared by the process illustrated in the following equation:

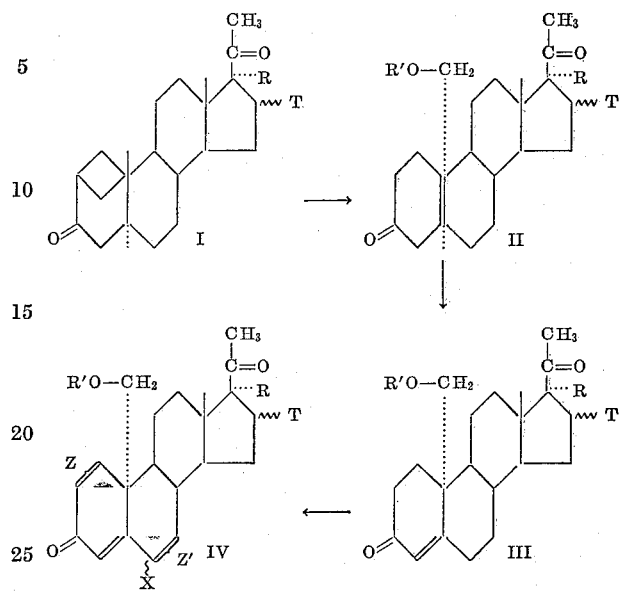

In the above formulae R, $R^1$, T, X, and Z have the same meaning as defined hereinbefore; and $Z^1$ represents a double bond or a saturated linkage between C-6 and C-7.

The starting compound of the present invention (I) which is a 2,19-cyclo-allopregnane-3,20-dione derivative, is prepared from the corresponding 19-hydroxy-$\Delta^4$-pregnene-3,20-dione, in accordance with my copending U.S. patent application Serial No. 231,828, filed of even date, now U.S. Patent No. 3,158,604, by conventional hydrogenation of the $\Delta^4$-double bond, conventional tosylation of 19-hydroxy group of the resulting 19-hydroxy-allopregnane-3,20-dione, and treatment of the thus obtained 19-tosyloxy-allopregnane-3,20-dione with a strong base, such as an alkali metal hydroxide in a polar organic solvent, such as a lower hydrocarbon alcohol.

In practicing the process outlined above, the starting compound (I) is treated with a strong base such as an alkali metal hydroxide, or a strong acid, such as sulfuric acid, in a suitable solvent, preferably a polar organic solvent, such as a lower hydrocarbon alcohol, at steam bath temperature for a period of time of the order of 4–5 hours thus affording the 10α-allopregnan-19-ol-3, 20-dione (II). The latter dione is treated with approximately two mole equivalents of bromine in the presence of hydrogen bromide, preferably in acetic acid solution, for 5 hours at room temperature, thus affording the corresponding 2,4-dibromo derivative, which upon treatment with sodium iodide in methyl-ethyl ketone at reflux temperature for a period of time of the order of 14 hours, followed by reaction of the produced compound with chromous chloride in acetone solution by conventional procedure yields the corresponding $\Delta^4$-10α-pregnen-19-ol-3,20-dione derivative (III). The last named 3,20-dione, upon reaction with ethylene glycol in the presence of p-toluenesulfonic acid, yields the corresponding 3,20-bis-cycloethylenedioxy-$\Delta^5$-10α-pregnen-19-ol derivative, which is treated with an organic peracid, such as monoperphthalic acid, in an inert solvent, preferably chloroform to produce the corresponding 3,20-bis-cycloethylenedioxy-5α,6α - oxido-10α-pregnan-19-ol.

Upon reaction of the latter 3,20-bis-cycloethylenedioxy-5α,6α-oxido compound with methyl magnesium bromide in an inert solvent, such as ether or tetrahydrofuran, followed by conventional working up and the treatment of the residue with a mineral acid, such as 8% sulfuric acid, and thereafter with thionyl chloride pyridine at about −10° C., for approximately 4 minutes, there is obtained the corresponding 6β-methyl-Δ⁴-10α-pregnen-19-ol - 3,20-dione (IV: $Z=Z^1=$ saturated linkage; $X=\beta$-methyl). The latter 6β-methyl derivative is treated with an alkali metal hydroxide such as sodium hydroxide in a suitable solvent such as methanol, thus affording the corresponding 6α - methyl derivative (IV: $Z=Z^1$=saturated linkage; $X=\alpha$-methyl).

The Δ⁴-10α-pregnen-19-ol-3,20-dione derivatives (III) are treated with ethyl orthoformate in the presence of p-toluenesulfonic acid, in an inert solvent, thus affording the corresponding 3-ethoxy-Δ³,⁵-10α-pregnadien-19-ol-20-one derivatives, which upon reaction with approximately 1 molar equivalent N-chlorosuccinimide or another N-chloroamide or imide, in the presence of sodium acetate or acetic acid, yielded the corresponding 6β-chloro-Δ⁴-10α-pregnen-19-ol-3,20 - dione derivative (IV: $Z=Z^1$=saturated linkage; $X=\beta$-chlorine). The aforesaid 3-ethoxy-Δ³,⁵-10α-pregnadien-19-ol - 2 - one derivatives are treated with perchloryl fluoride in dimethylformamide to produce the corresponding 6β-fluoro-Δ⁴-10α-pregnen-19-ol - 3,20-dione derivatives (IV: $Z=Z^1$=saturated linkage; $X=\beta$-fluorine).

Upon treatment of the 6β-halo-Δ⁴-3-keto compounds of the present invention in an acid medium such as hydrogen chloride-acetic acid, there are obtained the corresponding 6α-halo derivatives (IV: $Z=Z^1$=saturated linkage; $X=\alpha$-halogen).

The Δ⁴-10α-pregnen-19-ol-3,20-dione derivatives (IV: $Z=Z^1$=saturated linkage) are treated with 2,3-dichloro-5,6-dicyano-1,4-benzoquinone in a suitable solvent, such as dioxane, preferably at reflux temperature for a period of time of the order of 10 hours to produce the corresponding Δ¹,⁴-derivatives (IV: $Z$=double bond; $Z^1$=saturated linkage).

The Δ⁴-10α-pregnen-19-ol-3,20-dione derivatives (IV: $Z=Z^1$=saturated linkage) are treated with ethyl orthoformate in the presence of p-toluenesulfonic acid in an inert solvent, thus affording the corresponding 3-ethoxy-Δ³,⁵-10α-pregnadien-19-ol-20 - one, which upon reaction with approximately 1 molar equivalent of 2,3-dichloro-5,6-dicyano-1,4-benzoquinone, in an inert solvent, preferably tetrahydrofuran, at 0° C. for a period of time of the order of 30 minutes, yielded the corresponding Δ⁴,⁶-10α-pregnadien-19-ol-3,20-dione derivatives (IV: $Z$=saturated linkage; $Z^1$=double bond).

When treating the latter Δ⁴,⁶-compounds with 2,3-dichloro-5,6-dicyano-1,4-benzoquinone in dioxane, at reflux temperature, for a period of time of the order of 10 hours, there are obtained the corresponding Δ¹,⁴,⁶-pregnatriene derivatives (IV: $Z=Z^1$=double bond).

The compounds of the present invention having a primary hydroxyl group, for example in C–19, are conventionally acylated in pyridine with a suitable acylating agent, such as a chloride or an anhydride of a hydrocarbon carboxylic acid of the type defined hereinbefore, thus affording the corresponding acylates.

The compounds of the present having in the molecule a tertiary hydroxyl group, e.g. at C–17, are conventionally esterified in the presence of p-toluenesulfonic acid with an acylating agent, such as acetic anhydride, caproic anhydride, cyclopentylpropionic anhydride or enanthic anhydride, to produce the corresponding esters.

The compounds of the present invention having a 16α,17α-ketonide grouping, yield the corresponding 16α,17α-diols by conventional treatment with an acid, such as acetic acid. The obtained diols, upon conventional esterification in pyridine with an acylating agent, as for example acetic anhydride or caproic anhydride, afford the corresponding 16-acylates.

The latter 16α,17α-diols upon conventional condensation with a ketone or aldehyde, such as benzaldehyde, acetophenone, methyl-ethyl ketone, acetone, and the like, in the presence of an acid, yield the corresponding 16α,17α-methylenedioxy derivatives, wherein the substituents in the methylenedioxy group may be different from those of the previously hydrolyzed ketonide grouping.

The following specific examples serve to illustrate the present invention, but are not intended to limit the scope thereof:

Example I

A solution of 10 g. of 16α,17α-isopropylidenedioxy-2,19-cyclo-allopregnane-3,20-dione (obtained in accordance with my patent application Ser. No. 231,828, filed of even date) in 500 cc. of ethanol was treated with 500 cc. of a 60% aqueous sodium hydroxide solution and kept for 4 hours at steam bath temperature. The mixture was thereafter poured into water and extracted with methylene chloride. The organic extract was washed abundantly with water, dried over anhydrous sodium sulfate and evaporated to dryness. The residue was chromatographed on alumina, thus affording 16α,17α-isopropylidenedioxy-10α-allopregnan-19-ol-3,20 - dione (Compound No. 1).

Example II

A solution of 10 g. of 2,19-cycloallopregnane-3,20-dione (obtained according to my patent application Ser. No. 231,828, filed of even date) in 500 cc. of ethanol was treated with 500 cc. of 70% sulfuric acid and kept for 5 hours on the steam bath. It was then poured into water and extracted with methylene chloride. The extract was successively washed with water, sodium bicarbonate solution and water. Thereafter it was dried over sodium sulfate and evaporated to dryness. The residue was chromatographed on alumina, thus affording 10α-allopregnan-19-ol-3,20-dione (Compound No. 2).

The starting compounds listed under I (obtained in accordance with the aforesaid patent application) were treated by the same procedure, thus giving respectively the products set forth under II.

| I | Cpd. No. | II |
|---|---|---|
| 16α-methyl-2,19-cyclo-allopregnane-3,20-dione. | 3 | 16α-methyl-10α-allopregnan-19-ol-3,20-dione. |
| 16β-methyl-2,19-cyclo-allopregnane-3,20-dione. | 4 | 16β-methyl-10α-allopregnan-19-ol-3,20-dione. |
| 2,19-cyclo-allopregnan-17α-ol-3,20-dione. | 5 | 10α-allopregnane-17α,19-diol-3,20-dione. |
| 16α-methyl-2,19-cyclo-allopregnan-17α-ol-3,20-dione. | 6 | 16α-methyl-10α-allopregnane-17α,19-diol-3,20-dione. |

Example III

A solution of 2.1 mol equivalents of bromine in 15 cc. of glacial acetic acid was added dropwise to a solution of 1 g. of 16α,17α-isopropylidenedioxy-10α-allopregnan-19-ol-3,20-dione (Compound No. 1) in 25 cc. of acetic acid containing a few drops of 4 N hydrogen bromide in acetic acid. After five hours at room temperature, the mixture was poured into ice water and the precipitated dibromo derivative was collected, washed well with water, and dried. The dried material was refluxed for 14 hours with 2 g. of sodium iodide in 40 cc. of ethyl methyl ketone and then kept at room temperature for an additional 12 hours. After dilution with water, the product was extracted with ether, washed with sodium thiosulfate solution and water, and the ether was removed under reduced pressure.

The crude residue dissolved in 35 cc. of acetone, was treated in an atmosphere of carbon dioxide with a solution of chromous chloride prepared from 11 g. of chromic chloride. After 20 minutes at room temperature, water was added, the mixture was extracted with ether, washed with water until neutral, dried and evaporated. The resulting substance was saponified by refluxing for 30 minutes with 0.8 g. of potassium carbonate in 35 cc. of methanol and 7 cc. of water and after extraction with chloroform, it was chromatographed on 50 cc. of ethyl acetate-washed alumina. Recrystallization of the solid fractions afforded 16α,17α-isopropylidenedioxy-Δ⁴-10α-pregnen-19-ol-3,20-dione (Cpd. No. 7).

The Compounds Nos. 2 to 6 inclusive, were treated in accordance with the above procedure, thus affording respectively:

Cpd. No.—
8. Δ⁴-10α-pregnen-19-ol-3,20-dione.
9. 16α-methyl-Δ⁴-10α-pregnen-19-ol-3,20-dione.
10. 16β-methyl-Δ⁴-10α-pregnen-19-ol-3,20-dione.
11. Δ⁴-10α-pregnene-17α,19-diol-3,20-dione.
12. 16α-methyl-Δ⁴-10α-pregnene-17α,19-diol-3,20-dione.

Example IV

A suspension of 1 g. of 16α,17α-isopropylidenedioxy-Δ⁴-10α-pregnen-19-ol-3,20-dione (Cpd. No. 7) in 7.5 cc. of anhydrous peroxide-free dioxane was treated with 1.2 cc. of freshly distilled ethyl orthoformate and 0.8 g. of p-toluenesulfonic acid. The mixture was stirred at room temperature for 15 minutes and the resulting solution let stand for 30 minutes further. 0.8 cc. of pyridine were added and then water. The formed precipitate was collected by filtration, water washed and air dried. Recrystallization from acetone-hexane afforded 3-ethoxy-16α,17α-isopropylidenedioxy-Δ³,⁵-10α-pregnadien-19-ol-20-one (Cpd. No. 13).

Following the same procedure, the Compounds Nos. 8 to 12, inclusive, were respectively converted into:

Cpd. No.—
14. 3-ethoxy-Δ³,⁵-10α-pregnadien-19-ol-20-one.
15. 3-ethoxy - 16α - methyl-Δ³,⁵-10α-pregnadien-19-ol-20-one.
16. 3-ethoxy - 16β - methyl-Δ³,⁵-10α-pregnadien-19-ol-20-one.
17. 3-ethoxy-Δ³,⁵-10α - pregnadiene - 17α,19-diol-20-one.
18. 3-ethoxy - 16α - methyl - Δ³,⁵-10α-pregnadiene-17α,19-diol-20-one.

Example V

A mixture of 5 g. of 3-ethoxy-16α,17α-isopropylidenedioxy-Δ³,⁵-10α-pregnadien-19-ol-20-one (Cpd. No. 13), 2 g. of anhydrous sodium acetate and 100 cc. of acetone was treated with 32 cc. of water and the solution was cooled to a temperature between 0 and 5° C. There was then added 1.1 molar equivalents of N-chloro-succinimide and 2 cc. of glacial acetic acid and the mixture was stirred between 0 and 5° C. for 30 minutes. It was then diluted with water, kept overnight at 0° C. and the precipitate formed was collected, washed with water, dried under vacuum and recrystallized from acetone thus giving 6β-chloro-16α,17α - isopropylidenedioxy-Δ⁴-10α-pregnen-19-ol-3,20-dione (Cpd. No. 19).

Following the same procedure there were treated the Compounds Nos. 14 to 18, inclusive thus affording respectively:

Cpd. No.—
20. 6β-chloro-Δ⁴-10α-pregnen-10-ol-3,20-dione.
21. 16α-methyl - 6β-chloro-Δ⁴-10α-pregnen - 19-ol-3,20-dione.
22. 16β-methyl - 6β-chloro-Δ⁴ - 10α-pregnen-19-ol-3,20-dione.
23. 6β - chloro - Δ⁴-10α - pregnene - 17α,19-diol-3,20-dione.
24. 16α-methyl-6β-chloro - Δ⁴-10α-pregnene-17α,19-diol-3,20-dione.

Example VI 1 g. of 3-ethoxy-16α,17α-isopropylidenedioxy-Δ³,⁵-10α-pregnadien-19-ol-20-one (Cpd. No. 13) was dissolved in 25 cc. of dimethylformamide. The solution was cooled to 0° C. and a stream of perchloryl fluoride was passed for 5 minutes; the solution was allowed to come slowly to 20° C.; it was then poured into water and extracted with ethyl acetate. The extract was washed with saturated aqueous solution of sodium bicarbonate, then with water to neutrality, dried over anhydrous sodium sulfate, and evaporated to dryness. By chromatography over washed alumina there was isolated 6β-fluora-16α,17α-isopropylidenedioxy-Δ⁴-10α-pregnen-19-ol-3,20-dione (Cpd. No. 25).

The Compounds Nos. 14 to 18, inclusive, were treated by the above procedure, thus affording respectively:

Cpd. No.—
26. 6β-fluoro-Δ⁴-10α-pregnen-19-ol-3,20-dione.
27. 16α-methyl - 6β-fluoro-Δ⁴-10α-pregnen - 19-ol-3,20-dione.
28. 16β-methyl - 6β-fluoro - Δ⁴-10α - pregnen-19-ol-3,20-dione.
29. 6β - fluoro - Δ⁴-10α - pregnene - 17α,19-diol-3,20-dione.
30. 16α-methyl-6β - fluoro-Δ⁴-10α-pregnene-17α,19-diol-3,20-dione.

Example VII

Into a solution of 3 g. of compound No. 19 in 150 cc. of glacial acetic acid was passed a slow stream of dry hydrochloric acid for 4 hours, while maintaining the temperature around 15° C. The mixture was then poured into ice-water, the precipitate collected, washed with water, dried and recrystallized from acetone-hexane to give 6α-chloro - 16α,17α - isopropylidenedioxy-Δ⁴-10α-pregnen-19-ol-3,20-dione (Cpd. No. 31).

Following the same procedure, the Compounds Nos. 20 to 30, inclusive, were respectively converted into:

Cpd. No.—
32. 6α-chloro-Δ⁴-10α-pregnen-19-ol-3,20-dione.
33. 16α-methyl-6α-chloro-Δ⁴-10α-pregnen - 19 - ol-3,20-dione.
34. 16β-methyl - 6α-chloro - Δ⁴-10α-pregnen-19-ol-3,20-dione.
35. 6α-chloro - Δ⁴-10α-pregnene - 17α,19-diol-3,20-dione.
36. 16α-methyl-6α-chloro - Δ⁴-10α-pregnene-17α,19-diol-3,20-dione.
37. 6α-fluoro-16α,17α - isopropylidenedioxy-Δ⁴-10α-pregnen-19-ol-3,20-dione.
38. 6α-fluoro-Δ⁴-10α-pregnen-10-ol-3,20-dione.
39. 16α-methyl - 6α-fluoro-Δ⁴-10α - pregnen-19-ol-3,20-dione.
40. 16β-methyl - 6α-fluoro-Δ⁴ - 10α-pregnen-19-ol-3,20-dione.
41. 6α-fluoro-Δ⁴ - 10α-pregnene - 17α,19-diol-3,20-dione.
42. 16α-methyl-6α - fluoro-Δ⁴-10α - pregnen-17α,19-diol-3,20-dione.

Example VIII

A mixture of 5 g. of 16α,17α-isopropylidenedioxy-Δ⁴-10α-pregnen-19-ol-3,20-dione (Cpd. No. 7). 150 cc. of anhydrous benzene, 60 cc. of ethyleneglycol distilled over sodium hydroxide and 800 mg. of p-toluenesulfonic acid monohydrate was refluxed for 12 hours with the use of an adapter for the continuous removal of the water formed during the reaction. Aqueous sodium bicarbonate solution was added to the cooled mixture and the organic phase was separated, washed with water, dried over sodium sulfate and evaporated to dryness. The residue crystallized from acetone-hexane to give 3,20-bis-cycloethylenedioxy-16α,17α-isopropylidenedioxy-Δ⁵-10α-pregnen-19-ol (Cpd. No. 43).

A solution of the latter compound in 100 cc. of chloroform was cooled to 0° C. and mixed with 1.1 molar equivalents of monoperphthalic acid in ether solution. The mixture was kept at room temperature for 20 hours, diluted with water, the organic layer was separated, washed with aqueous sodium bicarbonate solution and with water to neutral, dried over anhydrous sodium sulfate and evaporated to dryness. Crystallization from acetone-hexane gave 3,20-bis-cycloethylenedioxy-5α,6α-oxido-16α,17α - isopropylidenedioxy-10α-pregnan-19-ol (Cpd. No. 44).

To a solution of 40 cc. of 4 N methylmagnesium bromide in ether was added, with stirring, a solution of 2 g. of the latter 5α,6α-oxide in 60 cc. of dry tetrahydrofuran and the stirred mixture heated under reflux for 30 minutes. The condenser was then replaced by a calcium chloride tube, the ether allowed to boil off and when the internal temperature reached 54° C., the condenser was readapted and the mixture refluxed for an additional 4 hours. 400 cc. of a saturated solution of ammonium chloride was added slowly to the cooled mixture which was then stirred for 15 minutes before transfer to a separatory funnel. Ethylacetate was added, the organic layer separated, washed, dried and evaporated, whereupon crystallization of the residue from aqueous methanol gave 3,20-bis-cycloethylenedioxy-6β-methyl-16α,17α - isopropylidenedioxy-10α - pregnane-5α,19-diol (Cpd. No. 45).

A solution of 2.0 g. of compound No. 45 in 70 cc. of methanol and 7 ml. of 8% aqueous sulfuric acid was refluxed for 40 minutes. It was then neutralized with saturated sodium carbonate solution, concentrated to ca. 20 ml. in vacuo and poured into water. The formed precipitate was filtered off and washed thoroughly with water. Recrystallization from acetone gave 6β-methyl-16α,17α-isopropylidenedioxy-10α-pregnane - 5α,19 - diol-3,20-dione (Cpd. No. 46).

A solution of 1 g. of the latter compound in 7 cc. of dry pyridine was cooled to −10° C., treated with 0.4 ml. of thionyl chloride and the mixture was allowed to stand for 4 minutes at this temperature. Ice water was added and the crystalline precipitate was filtered, washed and dried, yielding 6β-methyl-16α,17α-isopropylidenedioxy-$\Delta^4$-10α-pregnen-19-ol-3,20-dione (Cpd. No. 47).

When applying the above sequence of reactions to Compounds Nos. 8 to 12, inclusive, there were respectively obtained as final products:

Cpd. No.—
48. 6β-methyl-$\Delta^4$-10α-pregnen-19-ol-3,30-dione.
49. 6β,16α-dimethyl-$\Delta^4$-10α-pregnen-19 - ol - 3,20-dione.
50. 6β,16β-dimethyl-$\Delta^4$-10α-pregnen-19 - ol - 3,20-dione.
51. 6β-methyl-$\Delta^4$-10α-pregnene-17α,19 - diol - 3,20-dione.
52. 6β,16α-dimethyl-$\Delta^4$-10α-pregnene-17α,19 - diol-3,20-dione.

Example IX 1 g. of Compound No. 47 was dissolved in 20 cc. of methanol containing 0.2 g. of sodium hydroxide and the mixture was kept for one and a half hours at room temperature, then poured into water and extracted with methylene chloride. Evaporation of the methylene chloride solution and crystallization of the residue from acetonehexane yielded 6α-methyl-16α,17α-isopropylidenedioxy-$\Delta^4$-10α-pregnen-19-ol-3,20-dione, (Cpd. No. 53).

The Compounds Nos. 48 to 52, inclusive, were treated by the above procedure, affording respectively:

Cpd. No.—
54. 6α-methyl-$\Delta^4$-10α-pregnen-19-ol-3,20-dione.
55. 6α,16α-dimethyl-$\Delta^4$-10-pregnen - 19 - ol - 3,20-dione.
56. 6α,16β-dimethyl-$\Delta^4$-10α-pregnen - 19 - ol - 3,20-dione.
57. 6α-methyl-$\Delta^4$-10α-pregnene-17α-pregnene - 17α, 19-diol-3,20-dione.
58. 6α,16α-dimethyl-$\Delta^4$-10α-pregnene-17α,19 - diol-3,20-dione.

Example X

A mixture of 500 mg. of Compound No. 7, 10 cc. of dioxane and 350 mg. of 2,3-dichloro-5,6-dicyano-1,4-benzoquinone was refluxed for 10 hours. It was then cooled, the 2,3-dichloro-5,6-dicyano - 1,4 - benzohydroquinone formed during the reaction filtered off, and the filtrate evaporated to dryness. The residue was dissolved in acetone and filtered through 10 g. of alumina. Crystallization from acetone-hexane gave 16α,17α-isopropylidenedioxy-$\Delta^{1,4}$-10α-pregnadien-19-ol-3,20 - dione (Cpd. No. 59).

The Compounds Nos. 8 to 12 inclusive, were treated by the above procedure, to produce respectively:

Cpd. No.—
60. $\Delta^{1,4}$-10α-pregnadien-19-ol-3,20-dione.
61. 16α-methyl-$\Delta^{1,4}$-10α-pregnadien - 19 - ol - 3,20-dione.
62. 16β-methyl-$\Delta^{1,4}$-10α-pregnadien - 19 - ol - 3,20-dione.
63. $\Delta^{1,4}$-10α-pregnadiene-17α,19-diol-3,20-dione.
64. 16α-methyl-$\Delta^{1,4}$-10α-pregnadiene - 17α,19 - diol-3,20-dione.

Example XI

The Compounds Nos. 19, 25, 31, 37, 47 and 53 were treated following the procedure described in Example X, thus affording respectively:

Cpd. No.—
65. 6β-chloro-16α,17α - isopropylidenedioxy - $\Delta^{1,4}$-10α-pregnadien-19-ol-3,20-dione.
66. 6β-fluoro-16α,17α - isopropylidenedioxy - $\Delta^{1,4}$-10α-pregnadien-19-ol-3,20-dione.
67. 6α-chloro-16α,17α - isopropylidenedioxy - $\Delta^{1,4}$-10α-pregnadien-19-ol-3,20-dione.
68. 6α-fluoro-16α,17α - isopropylidenedioxy - $\Delta^{1,4}$-10α-pregnadien-19-ol-3,20-dione.
69. 6β-methyl-16α,17α - isopropylidenedioxy - $\Delta^{1,4}$-10α-pregnadien-19-ol-3,20-dione.
70. 6α-methyl-16α,17α - isopropylidenedioxy - $\Delta^{1,4}$-10α-pregnadien-19-ol-3,20-dione.

Example XII

A solution of 1 g. of 3-ethoxy-16α,17α-isopropylidenedioxy-$\Delta^{3,5}$-10α-pregnadien-19-ol-20-one (Cpd. No. 13) in 20 cc. of tetrahydrofuran was cooled to 0° C. and there were added 1.05 molar equivalents of 2,3-dichloro-5,6-dicyano-1,4-benzoquinone and 100 mg. of p-toluenesulfonic acid. The resulting mixture was further stirred at 0° C. for 30 minutes. The precipitated hydroquinone was filtered off and 100 cc. of methylene chloride were added to the filtrate.

The organic solution was washed with 5% aqueous sodium hydroxide solution until the washings were colorless, then with water to neutrality, dried over anhydrous sodium sulfate and evaporated to dryness. Crystallization from acetone-hexane gave 16α,17α-isopropylidenedioxy-$\Delta^{4,6}$-10α-pregnadien-19-ol-3,20-dione (Cpd. No. 71).

The compounds Nos. 14 to 18, inclusive, were treated in accordance with the above procedure, thus furnishing.

Cpd. No.—
72. $\Delta^{4,6}$-10α-pregnadien-19-ol-3,20-dione.
73. 16α-methyl-$\Delta^{4,6}$-10α-pregnadien-19-ol-3,20-dione.
74. 16β-methyl-$\Delta^{4,6}$-10α-pregnadien-19-ol-3,20-dione.
75. $\Delta^{4,6}$-10α-pregnadiene-17α,19-diol-3,20-dione.
76. 16α-methyl-$\Delta^{4,6}$-10α-pregnadiene - 17α,19 - diol-3,20-dione.

and a few drops of 3 N perchloric acid and stirred at room temperature for 2 hours. After diluting with water the chloroform layer was separated, washed with aqueous saturated sodium bicarbonate solution and then with water, the chloroform was distilled and the residue was purified by chromatography on neutral alumina, thus yielding 16α,17α - (ethylidenedioxy) - 6α-chloro-Δ⁴-10α-pregnen-19-ol-3,20-dione (Cpd. No. 115).

*Example XXII*

To a solution of 5 g. of 10α-allopregnane-17α,19-diol-3,20-dione (Compound No. 5) in 100 cc. anhydrous benzene there were added 1 g. of p-toluenesulfonic acid and 10 cc. of caproic anhydride and the mixture was allowed to stand for 24 hours at room temperature, poured into ice and water, and the resulting mixture stirred to effect hydrolysis of the excess anhydride. The benzene layer was separated and washed with 10% sodium carbonate solution and water. Drying evaporation and crystallization of the residue from ether-hexane produced 10α-allopregnane-17α,19-diol-3,20-dione dicaproate (Cpd. No. 116).

When applying the same procedure to Compounds Nos. 11, 12, 35, 41, 57, 63, 75, 85, 92, 103 and 113, there were respectively obtained:

Cpd. No.—
117. Δ⁴-10α - pregnene-17α,19-diol-3,20-dione dicaproate.
118. 16α - methyl-Δ⁴-10α-pregnene-17α,19-diol-3,20-dione dicaproate.
119. 6α - chloro - Δ⁴-10α-regnene-17α,19-diol-3,20-dione di-caproate.
120. 6α - fluoro - Δ⁴-10α-pregnene-17α,19-diol-3,20-dione dicaproate.
121. 6α - methyl - Δ⁴-10α-pregnene-17α,19-diol-3,20-dione dicaproate.
122. Δ¹,⁴-10α-pregnadiene-17α,19-diol-3,20-dione dicaproate.
123. Δ⁴,⁶ - 10α-pregnadiene-17α,19-diol-3,20-dione dicaproate.
124. Δ¹,⁴,⁶ - 10α-pregnatriene-17α,19-diol-3,20-dione dicaproate.
125. Δ⁴-10α-pregnene-17α,19-diol-3,20-dione 17-caproate-19-acetate.
126. Δ⁴ - 10α - pregnene-16α,17α,19-triol-3,20-dione tricaproate.
127. Δ⁴ - 10α - pregnene-16α,17α,19-triol-3,20-dione 16,19-diacetate 17-caproate.

*Example XXIII*

A suspension of 1 g. of Compound No. 117 in 60 cc. of methanol was treated with a solution of 1 g. of potassium carbonate in 6 cc. of water; the mixture was boiled under reflux for 1 hour and then cooled in ice and diluted with water. The formed precipitate was collected and recrystallized from acetone-hexane to yield Δ⁴-10α-pregnene-17α,19-diol-3,20-dione 17-caproate (Cpd. No. 128).

I claim:
1. A compound of the following formula:

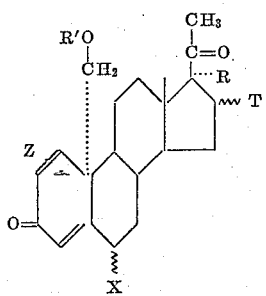

wherein X is selected from the group consisting of hydrogen, α-fluorine, β-fluorine, α-chlorine, β-chlorine, α-methyl and β-methyl; R is selected from the group consisting of hydrogen, a hydroxyl group and a hydrocarbon carboxylic acyloxy group of less than 12 carbon atoms; T is selected from the group consisting of hydrogen, α-hydroxyl, α-hydrocarbon carboxylic acyloxy of less than 12 carbon atoms, α-methyl and β-methyl, with T being other than hydrogen when R equals hydrogen; T and R together form the group

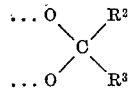

wherein R² and R³ are selected from the group consisting of hydrogen and a hydrocarbon residue of up to 8 carbon atoms; R¹ is selected from the group consisting of hydrogen and a hydrocarbon carboxylic acyl group of less than 12 carbon atoms; and Z is a member of the group consisting of a double bond and a saturated linkage between C–1 and C–2.

2. 16α,17α - isopropylidenedioxy - Δ⁴ - 10α - pregnen-19-ol-3,20-dione.
3. 16α-methyl-Δ⁴-10α-pregnen-19-ol-3,20-dione.
4. 16β-methyl-Δ⁴-10α-pregnene-19-ol-3,20-dione.
5. Δ⁴-10α-pregnene-17α,19-diol-3,20-dione.
6. 16α-methyl-Δ⁴-10α-pregnene-17α,19-diol-3,20-dione.
7. 6β-chloro-Δ⁴-10α-pregnen-19-ol-3,20-dione.
8. 6α-fluoro-Δ⁴-10α-pregnen-19-ol-3,20-dione.
9. 6α-methyl-Δ⁴-10α-pregnen-19-ol-3,20-dione.
10. Δ¹,⁴-10α-pregnadien-19-ol-3,20-dione.
11. 16α - methyl - Δ¹,⁴ - 10α - pregnadien - 19 - ol - 3,20-dione.
12. 6α - chloro - 16α,17α - isopropylidenedioxy - Δ¹,⁴-10α-pregnadien-19-ol-3,20-dione.
13. 6α - chloro - 16α,17α - isopropylidenedioxy - Δ⁴-10α-pregnen-19-ol-3,20-dione.
14. 6α - fluoro - 16α,17α - isopropylidenedioxy - Δ⁴-10α-pregnen-19-ol-3,20-dione.
15. 6α - methyl - 16α,17α - isopropylidenedioxy - Δ⁴-10α-pregnen-19-ol-3,20-dione.
16. 6α,16α-dimethyl-Δ⁴-10α-pregnen-19-ol-3,20-dione.
17. A compound of the following formula:

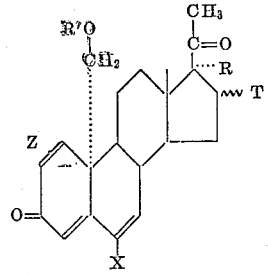

wherein X is selected from the group consisting of hydrogen, fluorine, chlorine and methyl; R is selected from the group consisting of hydrogen, a hydroxyl group and a hydrocarbon carboxylic acyloxy group of less than 12 carbon atoms; T is selected from the group consisting of hydrogen, α-hydroxyl, α-hydrocarbon carboxylic acyloxy of less than 12 carbon atoms, α-methyl and β-methyl; T and R together form the group

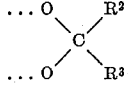

wherein R² and R³ are selected from the group consisting of hydrogen and a hydrocarbon residue of up to 8 carbon atoms; R¹ is selected from the group consisting of hydrogen and a hydrocarbon carboxylic acyl group of less than 12 carbon atoms; and Z is a member of the group consisting of a double bond and a saturated linkage between C–1 and C–2.

18. Δ⁴,⁶-10α-pregnadien-19-ol-3,20-dione.
19. Δ¹,⁴,⁶-10α-pregnatrien-19-ol-3,20-dione.

(References on following page)

Example XIII

A suspension of 1 g. of 6α-chloro-16α,17α-isopropylidenedioxy-Δ⁴-10α-pregnen-19-ol-3,20-dione (Cpd. 31) in 7.5 cc. of anhydrous peroxide-free dioxane was treated with 1.2 cc. of freshly distilled ethyl orthoformate and 0.8 g. of p-toluenesulfonic acid. The mixture was stirred at room temperature for 15 minutes and the resulting solution let stand for 30 minutes further. 0.8 cc. of pyridine were added and then water. The formed precipitate was collected by filtration, water washed and air dried. Recrystallization from acetone-hexane afforded 3-ethoxy-6-chloro-16α,17α-isopropylidenedioxy-Δ$^{3,5}$ - 10α-pregnadien-19-ol-20-one (Cpd. No. 77).

The latter compound was treated in accordance with Example XII, thus yielding 6-chloro-16α,17α-isopropylidenedioxy-Δ$^{4,6}$-10α-pregnadien - 19 - ol-3,20-dione (Cpd. No. 78).

The Compounds Nos. 37 and 53, were treated by the same procedures, thus affording, respectively, as final products:

6-fluoro - 16α,17α - isopropylidenedioxy - Δ$^{4,6}$-10α-pregnadien-19-ol-3,20-dione (Cpd. No. 79) and 6-methyl-16α,17α-isopropylidenedioxy-Δ$^{4,6}$-10α - pregnadien - 19-ol-3,20-dione (Cpd. No. 80).

Example XIV

The compounds Nos. 71 to 76, inclusive were treated in accordance with Example X, thus furnishing respectively:

Cpd. No.—
81. 16α,17α-isopropylidenedioxy-Δ$^{1,4,6}$ - 10α-pregnatrien-19-ol-3,20-dione.
82. Δ$^{1,4,6}$-10α-pregnatrien-19-ol-3,20-dione.
83. 16α-methyl-Δ$^{1,4,6}$-10α-pregnatrien-19-ol-3,20-dione.
84. 16β-methyl-Δ$^{1,4,6}$-10α-pregnatrien-19-ol-3,20-dione.
85. Δ$^{1,4,6}$-10α-pregnatriene-17α,19-diol-3,20-dione.
86. 16α-methyl-Δ$^{1,4,6}$-10α-pregnatriene-17α,19-diol-3,20-dione.

Example XV

A mixture of 1 g. of 10α-allopregnan-19-ol-3,20-dione (Cpd. No. 2), 4 cc. of pyridine and 2 cc. of acetic anhydride was kept at room temperature overnight, poured into ice water, the formed precipitate was filtered, washed with water and dried. Crystallization from acetone-hexane gave 10α-allopregnan-19-ol-3,20-dione acetate (Cpd. No. 87).

Following the same procedure, there were treated the Compounds Nos. 7 to 12 inclusive, thus furnishing respectively:

Cpd. No.—
88. 16α,17α-isopropylidenedioxy-Δ⁴-10α-pregnen-19-ol-3,20-dione acetate.
89. Δ⁴-10α-pregnen-19-ol-3,20-dione acetate.
90. 16α-methyl-Δ⁴-10α-pregnen-19-ol-3,20-dione acetate.
91. 16β-methyl-Δ⁴-10α-pregnen-19-ol-3,20-dione acetate.
92. Δ⁴-10α-pregnene-17α,19-diol-3,20-dione 19-acetate.
93. 16α-methyl-Δ⁴-10α-pregnene-17α,19-diol-3,20-dione 19-acetate.

Example XVI

The compounds Nos. 20, 38, 54, 60, 61, 67, 72 and 82 were treated according to Example XV thus affording respectively:

Cpd. No.—
94. 6β-chloro-Δ⁴-10α-pregnen-19-ol-3,20-dione acetate.
95. 6α-fluoro-Δ⁴-10α-pregnen-19-ol-3,20-dione acetate.
96. 6α-methyl-Δ⁴-10α-pregnen-19-ol-3,20-dione dione.
97. Δ$^{1,4}$-10α-pregnadien-19-ol-3,20-dione acetate.
98. 16α-methyl-Δ$^{1,4}$-10α-pregnadien-19-ol-3,20-dione acetate.
99. 6α-chloro-16α,17α-isopropylidenedioxy-Δ$^{1,4}$-10α-pregnadien-19-3,20-dione acetate.
100. Δ$^{4,6}$-10α-pregnadien-19-ol-3,20-dione acetate.
101. Δ$^{1,4,6}$-10α-pregnatrien-19-ol-3,20-dione acetate.

Example XVII

The starting compounds of Examples XV and XVI were treated according to Example XV, except that acetic anhydride was substituted by caproic anhydride, enanthic anhydride and undecenoic anhydride, thus affording respectively the corresponding caproates, enanthates, and undecenoates.

Example XVIII 1 g. of 16α, 17α-isopropylidenedioxy-10α-allopregnan-19-ol-3,20-dione (Cpd. No. 1) was heated on the steam bath with 100 cc. of 80% acetic acid under nitrogen for 7 hours, it was then concentrated under vacuum to a small volume and poured into water. The precipitate was collected, washed well with water, dried and recrystallized from acetone-hexane, thus furnishing 10α-allopregnane-16α, 17α,19-triol-3,20-dione (Cpd. 102).

The Compounds Nos. 7, 31, 37, 53, 59, 67, 68, 71, 78, and 81 were treated by the same procedure, thus furnishing respectively:

Cpd. No.—
103. Δ⁴ - 10α-pregnene-16α,17α,19-triol-3,20-dione.
104. 6α - chloro-Δ⁴-10α-pregnene-16α,17α,19-triol-3,20-dione.
105. 6α - fluoro-Δ⁴-10α-pregnene-16α,17α,19-triol-3,20-dione.
106. 6α - methyl-Δ⁴-10α-pregnene-16α,17α,19-triol-3,20-dione.
107. Δ$^{1,4}$ - 10α - pregnadien - 16α,17α,19-triol-3,20-dione.
108. 6α - chloro-Δ$^{1,4}$-10α-pregnadien-16α,17α,19-triol-3,20-dione.
109. 6α - fluoro-Δ$^{1,4}$-10α-pregnadien-16α,17α,19-triol-3,20-dione.
110. Δ$^{4,6}$ - 10α - pregnadien-16α,17α,19-triol-3,20-dione.
111. 6 - chloro-Δ$^{4,6}$-10α-pregnadien-16α,17α,19-triol-3,20-dione.
112. Δ$^{1,4,6}$ - 10α - pregnatrien-16α,17α,19-triol-3,20-dione.

Example XIX

The Compound No. 103 was treated in accordance with Example XV, thus giving Δ⁴-10α-pregnene-16α,17α,19-triol-3,20-dione 16,19-diacetate (Cpd. No. 113).

When applying the same procedure to the rest of the final compounds set forth in Example XVIII, there were obtained the corresponding 16,19-diacetates.

Example XX

A mixture of 1 g. of Compound No. 103, 50 cc. of freshly distilled acetophenone and 0.5 cc. of 72% perchloric acid was stirred at room temperature for 1 hour. The resulting mixture was washed with sodium bicarbonate solution and with water to neutrality, then it was steam distilled and the product extracted with methylene chloride. The extract was dried over anhydrous sodium sulfate and evaporated to dryness. Crystallization from aceton-hexane yielded the 16,17-acetophenonide of Δ⁴-10α-pregnene-16α,17α,19-triol-3,20-dione (Cpd. No. 114).

Example XXI

A solution of 500 mg. of compound No. 104 in 20 cc. of chloroform was treated with 1 g. of acetaldehyde

References Cited by the Examiner

UNITED STATES PATENTS 3,013,025   12/61   Zaffaroni _____ 260—397.1

OTHER REFERENCES

Castells et al.: J. Chem. Soc., pages 2627–2639 (1960).
Chen.: Tetrahedron 3, pages 43–48 (1958).
Fieser et al.: Steroids, pages 138–142 (1959 ed.), Reinhold Pub. Company, New York.
Mayor et al.: J. Chem. Soc., pages 2792–2800 (1960).
Mayor et al.: J. Chem. Soc. pages 2800–2802 (1960).
Rappoldt et al.: Rec. Trav. Chem. 80, pages 43–46, January 1961.

LEWIS GOTTS, *Primary Examiner.*